United States Patent [19]
Miller

[11] 3,948,096
[45] Apr. 6, 1976

[54] APPARATUS FOR COMPUTING THE ACCELERATION OF AN AIRCRAFT ALONG ITS FLIGHT PATH

[75] Inventor: Harry Miller, Scottsdale, Ariz.

[73] Assignee: Sperry Rand Corporation, New York, N.Y.

[22] Filed: Oct. 17, 1973

[21] Appl. No.: 407,401

Related U.S. Application Data

[60] Division of Ser. No. 124,690, March 16, 1971, Pat. No. 3,791,208, which is a continuation-in-part of Ser. No. 873,044, Oct. 31, 1969, abandoned.

[52] U.S. Cl. .............................. 73/178 R; 235/150.2
[51] Int. Cl.² .......................................... G01C 21/10
[58] Field of Search .............. 73/178 R, 178 T, 180; 235/150.2, 150.22

[56] References Cited
UNITED STATES PATENTS 3,651,691  3/1972  Pliha................................. 73/178 R
3,654,443  4/1972  Dendy et al...................... 73/178 R Primary Examiner—Donald O. Woodiel
Attorney, Agent, or Firm—Howard P. Terry; Albert B. Cooper

[57] ABSTRACT

Apparatus for providing a measure of the acceleration of an aircraft along its flight path derived from computations involving inertial measurements of longitudinal and normal accelerations of the aircraft relative to the direction of the earth's "g" field as determined by a gyro vertical, in conjunction with a measurement of true airspeed as determined by an air data computer responsive to a Pitot static sensor. The computation includes filtering means responsive to the inertial and air data measurements to compensate for the relatively long term errors introduced by the gyro vertical erection characteristics and the relatively short term errors introduced by the Pitot-static sensor of airspeed.

3 Claims, 10 Drawing Figures

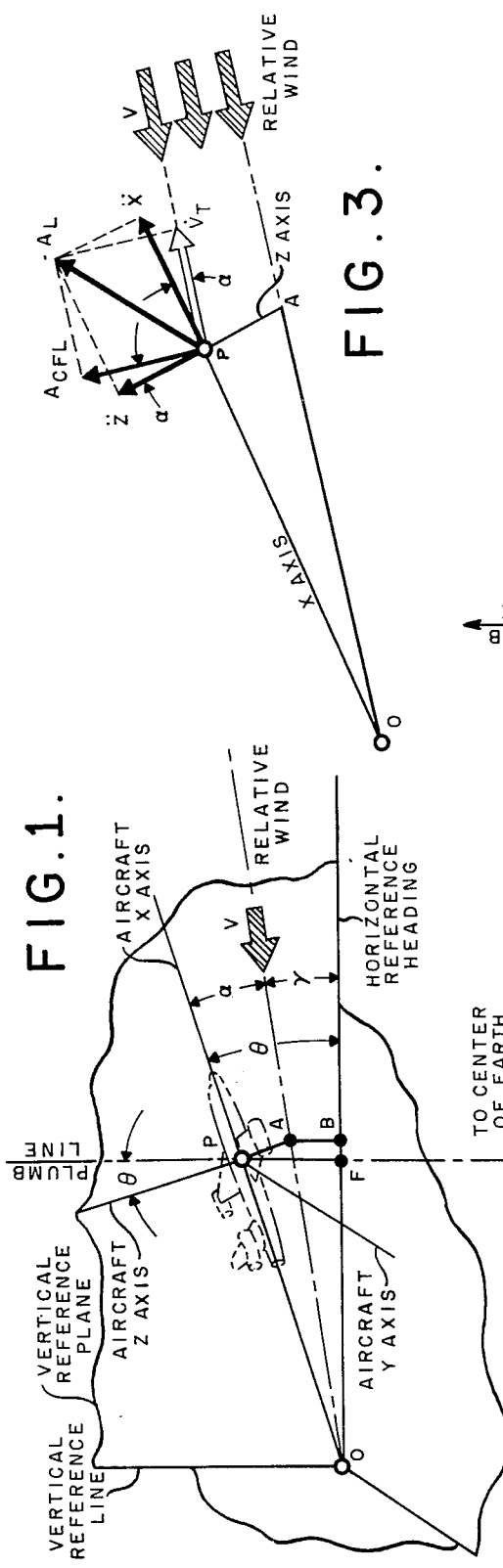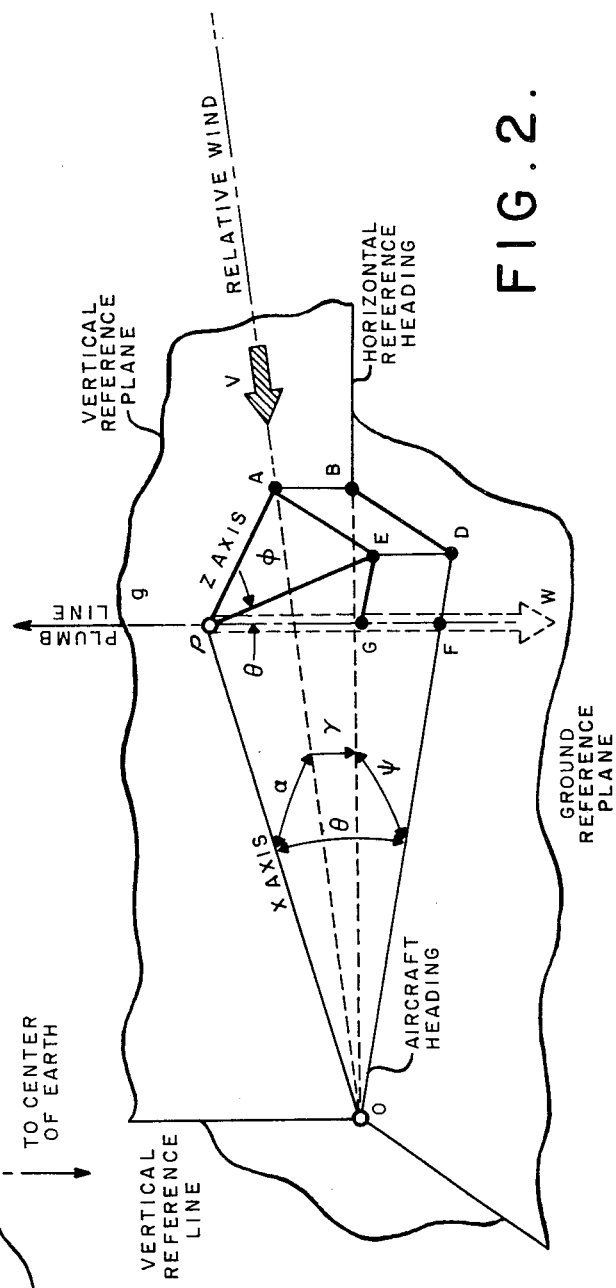

3,948,096

APPARATUS FOR COMPUTING THE ACCELERATION OF AN AIRCRAFT ALONG ITS FLIGHT PATH

CROSS REFERENCES TO RELATED APPLICATIONS

This application is a divisional of U.S. patent application Ser. No. 124,690, filed Mar. 16, 1971 and now U.S. Pat. No. 3,791,208 which in turn is a continuation-in-part of U.S. patent application Ser. No. 873,044, filed Oct. 31, 1969 now abandoned.

BACKGROUND OF THE INVENTION

The present invention relates in general to aircraft control systems and more particularly to apparatus for measuring the true angle of attack of an aircraft from measures of longitudinal axis and normal axis accelerations in conjunction with measures of craft vertical and forward airspeed; such measure of angle of attack being derived in a manner that is independent of the aerodynamic characteristics of the aircraft and hence is applicable to a variety of airframe designs without the requirement of extensive and costly flight test calibration. Another aspect of the present invention includes the computation of precise measures of craft acceleration along the flight path and instantaneous vertical speed both of which are devoid of deleterious effects of vertical gyro erection control effects.

The angle of attack of an aircraft is a basic parameter of flight and an extremely useful one in the guidance and control of an aircraft. However, in the past, angle of attack has not been extensively used, particularly in the guidance and control of an aircraft, primarily because of the difficulty of obtaining an accurate, noise-free signal representative thereof over a wide range of aircraft operation and flight conditions. Heretofore, angle of attack has been measured by means of probes or vanes protruding from the outside surface of the aircraft and which in one way or another measured the characteristics of air flow patterns. Such devices are subject to flow anomolies due to surface shapes and other external aircraft characteristics resulting in data that had to be very highly filtered or damped in order to provide useful control information. Furthermore, such external probes are subject to inadvertent damage due to dust, ice, ground handling and the like, creating failure and maintenance problems. Supersonic speeds will, in the future, create skin heat problems rendering probes and vanes very impractical.

While some success has been obtained in measuring angle of attack without using vanes and probes, the computations required the use of vertical gyro long term pitch (and roll) attitude data. See for example applicant's co-pending U.S. application Ser. No. 699,638 filed Jan. 22, 1968, entitled "Airspeed Command Systems" now Pat. No. 3,522,729. The principal disadvantage of vertical gyro data is that it is subject to inaccuracies due to erection and drift characteristics in long term maneuvering (accelerated) flight. Furthermore, the reference datum is the earth's horizontal plane rather than the aircraft longitudinal plane resulting in errors during banked turns.

SUMMARY OF THE INVENTION

According to the teachings of the present invention, craft angle of attack is derived from measures of accelerations acting on the aircraft and sensed by linear accelerometers strapped to the longitudinal and vertical axes of the aircraft. The outputs of these accelerometers are combined with air data information including true airspeed and altitude rate, and short term vertical gyro data to provide an accurate measure of angle of attack over a wide frequency spectrum. Signal filter and washout techniques are advantageously used to eliminate the effects of sensor misalignments and tolerances, the effects of vertical gyro erection characteristics, the effects of pitching motions on the pitot static source, and the effects of windshear and gust turbulence. Necessary to the computation of angle of attack is an accurate measure of acceleration along the flight path of the aircraft. This measure is obtained in a unique manner, again using the accelerometer outputs together with the derived measure of angle of attack and true airspeed (or Mach number), and employing feedback and washout techniques.

The measure of angle of attack provided by the computer of the present invention is accurate in all flight regimes of a typical transport type aircraft and does not depend upon the aerodynamic characteristics of a specific airframe design and hence is applicable to a variety of airframe configurations without extensive flight test calibration. Additionally, the computation takes into account all accelerations acting on the airframe including those associated with curvalinear flight, i.e., the centrifugal acceleration of a banked turn and the centrifugal acceleration due to rate of rotation of the flight path.

In effect, the measure of craft angle of attack is derived from the orthogonal accelerometers, the direction of the relative wind and the change in craft velocity, herein referred to as airspeed acceleration, and a determination of instantaneous craft attitude as reflected by the direction of the gravity constant.

The general technique herein employed for the computation of the various parameters (angle of attack, flight path angle, vertical speed, acceleration along the flight path) involves the generation of a plurality of measures of the same or similar parameters from generally different sources each having objectionable frequency response characteristics under a variety of operating of flight conditions and processing these signals through frequency responsive networks in a manner to eliminate the undesirable characteristics and yet retain the desirable dynamic responses and accuracy. Thus, a plurality of measures of the flight path acceleration and vertical speed of the aircraft are derived, one based on inertially derived measures and the other from the outputs of an air data computer. These outputs are processed through filter and washout networks which extract a resultant output having the desirable frequency components of the parameters for all flight conditions. The invention of the present divisional application relates to the computations for deriving and providing a signal which is an accurate measure of the acceleration of the aircraft along its flight path.

DESCRIPTION OF THE FIGURES OF THE DRAWINGS

A preferred embodiment of the present invention is disclosed in the following description, reference being made therein to the accompanying drawings, wherein;

FIGS. 1 and 2 illustrate angular orientation of the aircraft with respect to the earth during level and turning flight, respectively, and where the plane of symmetry of the airplane is defined as that which contains the triangle OPA.

FIGS. 3 and 4 are vector diagrams which illustrate the accelerations and forces, respectively, acting at the center of gravity of the aircraft in the plane of symmetry thereof.

DESCRIPTION OF THE PREFERRED EMBODIMENT

Figure 4:
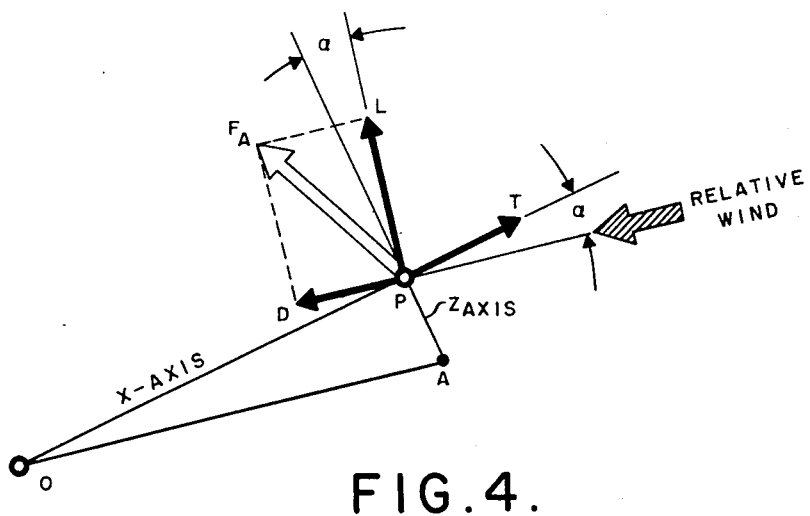

The angle of attack computer involves the forces and accelerations at the center of mass of an airplane in maneuvering flight. FIGS. 1 through 5 illustrate the geometric orientation of the applicable accelerations and forces. These figures are used to derive the fundamental mathematical relationships which form the basis for the implementation of the preferred angle of attack computer.

FIG. 1 illustrates aircraft conditions during level flight; FIG. 2 illustrates conditions during bank turns. In both FIGS. 1 and 2 the plane of symmetry of the airplane is that which contains the triange OPA. The point P is at the center of mass of the airplane. The line OP is a longitudinal reference line that is fixed to the airplane and is designated the X-axis. The point O represents the intersection of the X-axis with the ground reference plane, which plane is orthogonal to a plumb line extending from the airplane's center of mass P to the center of the earth.

The X and Z axes of the airplane are located in the plane of symmetry of the aircraft. The Z-axis extends through the center of mass P and is orthogonal to the X-axis. A third reference line is designated the Y-axis. It also extends through the center of mass, forming with the X and Z axes a three dimensional mutually orthogonal frame of reference that is fixed to the airplane.

The vertical reference plane shown in FIGS. 1 and 2 is a plane that goes through point O, is orthogonal to the ground plane and, in addition, contains a line that is parallel to the direction of the relative wind. The angle between the direction of the relative wind and the X-axis of the airplane is the angle of attack of the airplane, designated $\alpha$. The angle between the direction of the relative wind and the ground plane is the flight path angle of the airplane, designated $\tau$. The angle between the X-axis of the airplane and the ground plane is the pitch angle of the airplane, designated $\theta$. The pitch angle and flight path angle are measured in vertical planes which are orthogonal to the ground plane.

During wings-level flight (FIG. 1) the plane of symmetry is coincident with the vertical reference plane. Since the pitch angle and flight path angle are measured in the same plane, the pitch angle equals the sum of angle of attack and flight path angle; that is:

$$\theta = \alpha + \gamma \quad (1)$$

During turning flight (FIG. 2), the plane of symmetry (defined by the triange O-P-A) is not coincident with the vertical plane which contains the direction of the relative wind. Under these conditions, the pitch angle and flight path angle are not measured in the same plane and equation (1) does not hold. The flight path angle is measured in the plane which contains triangle O-A-B while the pitch angle is measured in the plane which contains the quadrangel O-P-E-D.

The angle designated as $\phi$ in FIG. 2 is the aircraft bank angle. The bank angle can be measured by the outer gimbal structure of a vertical gyroscope whose spin axis is slaved to be aligned with a plumb line which extends from the center of mass P to the center of the earth. This plumb line intersects the ground reference plane at point F in FIGS. 1 and 2. The angle $\phi$ is the angle between the Z-axis of the airplane and a line in the vertical pitch angle plane which is perpendicular to the X-axis of the airplane.

Figure 5:
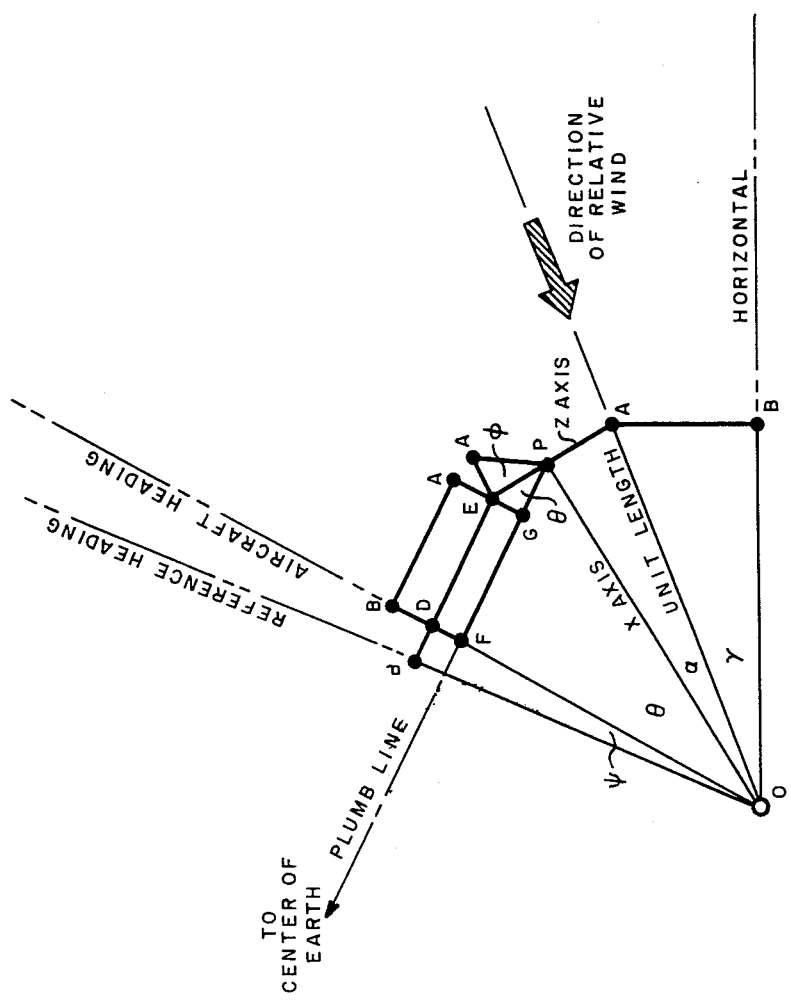
FIG. 5 is a foldout of the polyhedron illustrated in FIG. 2 showing the angular relationships of the aircraft reference frame relative to the earth's frame of reference and is useful in analyzing the orientation of the various directions defined by the lines of FIG. 2.

It is helpful in determining the orientation of the various angles of FIG. 2 to consider the lines of FIG. 2 as the edges of a six-sided polyhedron, each side of which is a right triangle or a rectangle. The foldout of these sides is illustrated in FIG. 5. The letters defining points of the several triangles correspond to those shown in FIG. 2. The mathematical derivations set forth below prove the general expression which relates pitch angle, angle of attack, and flight path angle $$OA = 1$$

$$AB = \sin \gamma$$

$$OB = \cos \gamma$$

$$AP = \sin \alpha$$

$$OP = \cos \alpha$$

$$OF = OP \cos \theta = \cos \alpha \cos \theta$$

$$FP = OP \sin \theta = \cos \alpha \sin \theta$$

$$EP = AP \cos \phi = \sin \alpha \cos \phi$$

$$GP = EP \cos \theta = \sin \alpha \cos \phi \cos \theta$$

$$EG = EP \sin \theta = \sin \alpha \cos \phi \sin \theta$$

$$EA = AP \sin \phi = \sin \alpha \sin \phi$$

Since $$DB = EA$$

and $$\sin \psi = \frac{DB}{OB}$$

$$\sin \psi = \frac{\sin \alpha \sin \phi}{\cos \gamma}$$

Also, $$OD = OB$$

$$\cos \psi = \cos \gamma \cos \psi$$

Since $$FG = FP - GP$$

and $$FG = ED = AB$$

$$\sin \gamma = \cos \alpha \sin \theta - \sin \alpha \cos \phi \cos \theta \quad (2)$$

FIGS. 3 and 4 are concerned with forces and accelerations in the aircraft plane of symmetry which contains the X and Z axes (plane defined by triangle O-P-A).

The flow of air passing the aircraft will generate an aerodynamic force on the aircraft. This is shown as an open arrow $F_A$ in FIG. 4. For convenience, this force is resolved into two components, designated drag and lift. The drag component D is along the flight path of the airplane (along the direction of the relative wind). The lift component L is at right angles to the flight path.

The thrust due to the engines is in a forward direction along the X-axis of the airplane. It is designated T in FIG. 4. The vector sum of thrust, drag, and lift will form a resultant force which is used to balance the gravity attraction of the earth, with any excess causing aircraft acceleration.

A total acceleration $a_P$ exists at the center of mass of the airplane. The time history of the magnitude and direction of the total acceleration vector will determine the flight path of the airplane. It is convenient to resolve the total acceleration vector into three mutually orthogonal components. These are along the X, Y and Z axes, designated $\ddot{X}$, $\ddot{Y}$ and $\ddot{Z}$, respectively. The components in the plane of symmetry are $\ddot{X}$ and $\ddot{Z}$. These can be combined to form the longitudinal acceleration vector, designated $a_L$. The vector components in the plane of symmetry are shown in FIG. 3.

The longitudinal vector $a_L$ can also be resolved into a second pair of mutually orthogonal components; along the flight path and at right angles to the flight path. These components are designated $\dot{V}_T$ and $a_{CFL}$ in FIG. 3. The teaching of this disclosure assumes that the relative wind impinges on the aircraft essentially along the plane of symmetry. This will be true if the aircraft is not in a sideslip condition; that is, if the airplane is operating with negligible rudder deflection. Under these conditions, $\dot{V}_T$ as shown in FIG. 3, represents the acceleration along the flight path. The components $a_{CFL}$ and $\ddot{Y}$ can be combined by vector addition. The resultant will be the centrifugal acceleration on the aircraft, arising because the airplane mass is moving along a curved path.

Linear accelerometers, which are strapped to the aircraft X, Y and Z axes, can be used to measure the accelerations. If it is assumed that the aircraft operates with small sideslip angles, it is only necessary to consider the accelerations along the X and Z axes. The relationships can be summarized as follows:

$$\dot{V}_T = \ddot{X} \cos \alpha - \ddot{Z} \sin \alpha \quad (3)$$

$$a_{CFL} = \ddot{X} \sin \alpha + \ddot{Z} \cos \alpha \quad (4)$$

The outputs of linear accelerometers that are strapped to the X and Z axes contain spurious signals because they are affected by the gravitational field of the earth. This effect can be analyzed by replacing the gravitational field of the earth with an equivalent value of acceleration. This is shown as an upward arrow from point P in FIG. 2 and is designated $g$. If the gravitational field of the earth were removed, the mass of the airplane would be subjected to a force W along the plumb line, exactly equivalent to that existing when the earth's gravitational field was present.

The accelerometers cannot differentiate between the equivalent acceleration of the earth's gravitational field and the $\ddot{X}$ and $\ddot{Z}$ acceleration components. The effects can be compensated, however, because the value of $g$ is accurately known as is its direction (along a plumb line). All that is necessary is to resolve the $g$ acceleration along the particular axis of interest. From FIG. 2, the spurious component along the X-axis is $g \sin \theta$; along the Z-axis it is $g \cos \theta \cos \phi$; along the Y-axis it is $g \cos \theta \sin \phi$; along the flight path it is $g \sin \gamma$. The signal outputs of the accelerometers are designated $a_X$ and $a_Z$:

$$a_X = \ddot{X} + g \sin \theta \quad (5)$$

$$a_Z = \ddot{Z} + g \cos \theta \cos \phi \quad (6)$$

Equations (3) and (4) can accordingly be expressed:

$$\dot{V}_T = (a_X - g \sin \theta) \cos \alpha - (a_Z - g \cos \theta \cos \phi) \sin \alpha \quad (7)$$

$$a_{CFL} = (a_X - g \sin \theta) \sin \alpha + (a_Z - g \cos \theta \cos \phi) \cos \alpha \quad (8)$$

The acceleration along the flight path is proportional to the resultant of forces which act along the flight path. These include contributions from thrust, drag and weight. The lift component (being orthogonal to the flight path) does not contribute force in the direction of flight. Referring to FIG. 2, the component of weight along the flight path is $W \sin \gamma$. The net force along the flight path is proportional to flight path acceleration:

$$\frac{W}{g} \dot{V}_T = T \cos \alpha - D - W \sin \gamma \quad (9)$$

This can also be written as:

$$\frac{T \cos \alpha - D}{W} = \frac{\dot{V}_T}{g} + \sin \gamma \quad (10)$$

Mathematical manipulations of equations (2), (7), and (9) result in the following relationship:

$$\frac{T \cos \alpha - D}{W} = \frac{a_X \cos \alpha - a_Z \sin \alpha}{g} \quad (11)$$

Equating equations (10) and (11):

$$\frac{\dot{V}_T}{g} + \sin \gamma = \frac{a_X \cos \alpha - a_Z \sin \alpha}{g} \quad (12)$$

Equation (12) is the basis for the angle of attack computer implementation when written in the form:

$$\sin \alpha = \frac{a_X \cos \alpha - \dot{V}_T - g \sin \gamma}{a_Z} \quad (13)$$

The flight path angle can be expressed as:

$$\sin \gamma = \frac{\dot{h}}{V} \qquad (14)$$

where $\dot{h}$ is aircraft vertical speed and $V$ is velocity along the flight path.

Figure 8:
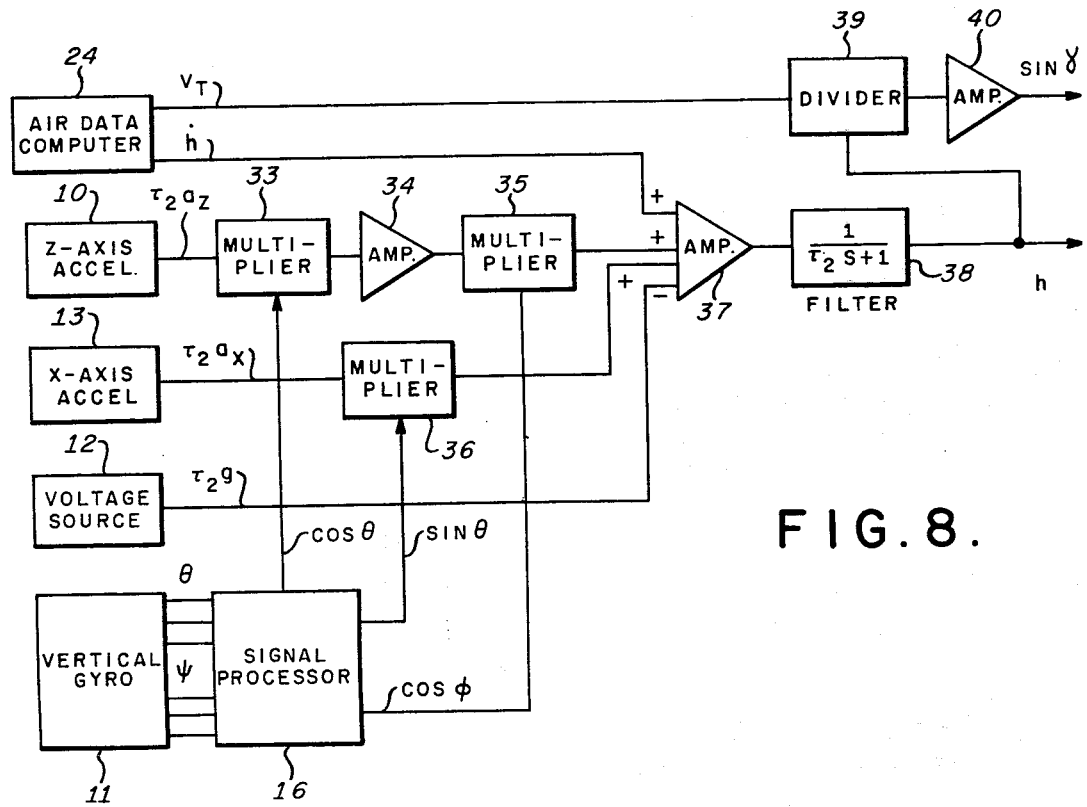
FIGS. 6, 7 and 8 are block diagrams representing preferred embodiments of computer techniques for deriving angle of attack, acceleration along the flight path, and flight path angle, respectively.
Figure 6:
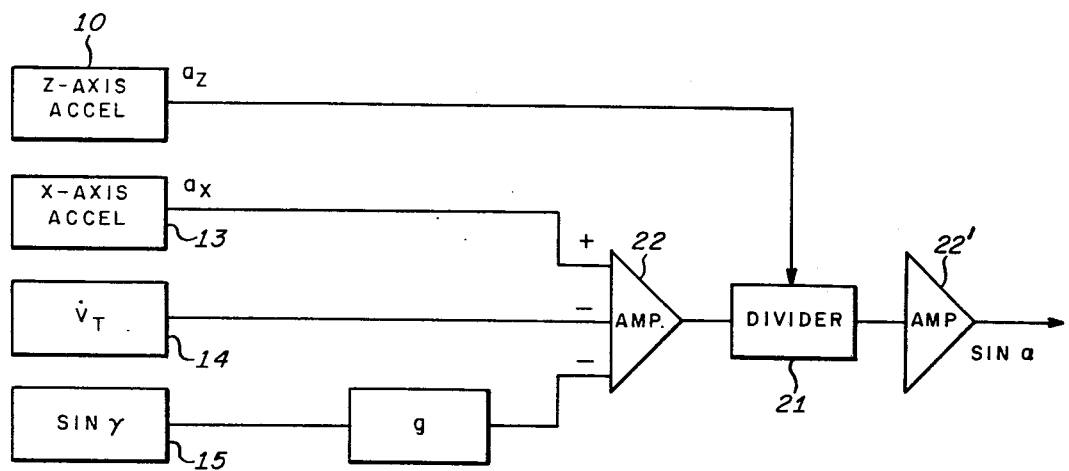
Figure 7:
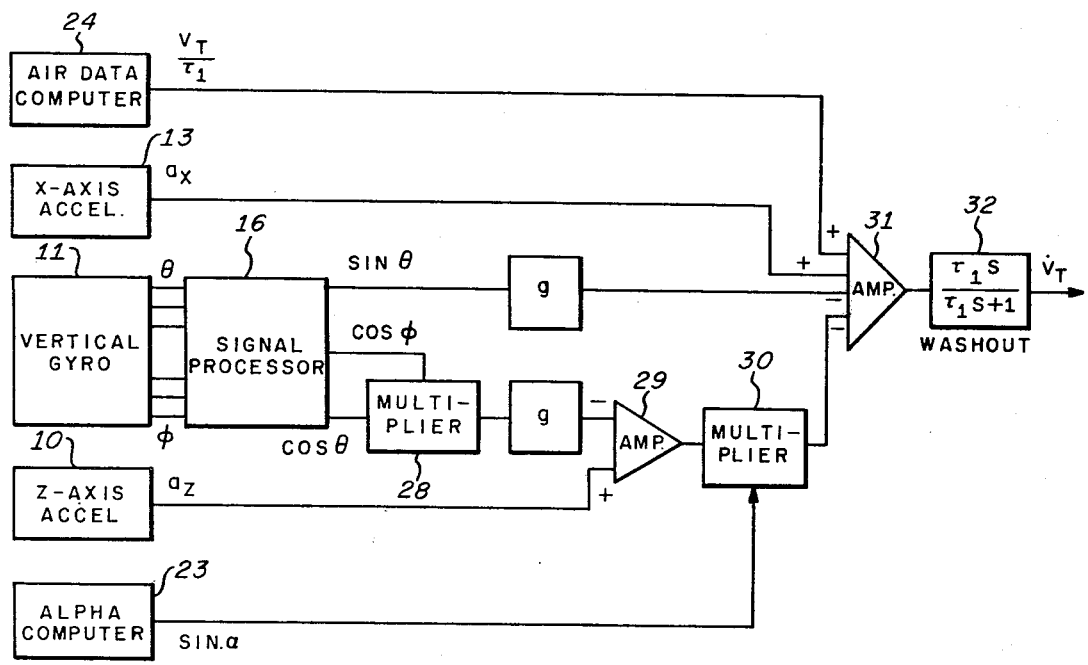

FIG. 6 illustrates an analog computer arrangement deriving a measure of angle of attack in accordance with equation (13) relation. However, it will be understood that the computations may likewise be performed by a general purpose digital computer wherein the data inputs are suitably digitized. The blocks shown at the left of FIG. 6 represent the sources of data for the angle of attack computer and in general comprise only the orthogonal accelerometers, an air data computer, and a vertical gyro. In FIG. 6 the sources comprise the output of a Z-axis accelerometer 10, the output of an X-axis accelerometer 13, a source 14 of data proportional to the acceleration along the flight path, and a source 15 of data proportional to the sine of flight path angle. The the apparatus for performing the computations of craft acceleration along the flight path and flight path angle are shown in FIGS. 7 and 8, respectively, and will be discussed fully herein below. The terms $a_X$ and $a_Z$ are provided by a pair of linear accelerometers 13 and 10 mounted on the X and Z axes, respectively, of the aircraft as denoted in FIGS. 1 through 5. The accelerometers may be of any conventional configuration and may be, for example, of the type shown in applicant's assignee's U.S. Pat. No. 3,190,128. However, accelerometers 10 and 13 may have any angular orientation relative to the aircraft as long as they are orthogonal and lie in the plane of symmetry of the aircraft, viz., the X-Z plane. A conventional vertical gyroscope 11 (FIG. 8) is employed for providing the pitch term $\theta$ and roll term $\phi$ from conventional three-wire synchro-type pick-offs mounted on the pitch and roll axes thereof. Such gyros may be of the general type illustrated in Applicant's assignee's U.S. Pat. No. 2,945,381. The three-wire outputs of the vertical gyro are suitably modified by a signal processor 16, which may comprise Scott T transformers to generate voltages which are proportional to the cosine of pitch angle, sine of pitch angle, and cosine of roll angle. Electronic divider 21 may be of any conventional type and may, for example, comprise operational amplifiers and pulse-width modulation techniques familiar to those skilled in the analog computation art. These devices are used to provide voltage outputs proportional to the quotient of two variable inputs.

Vertical accelerometer 10 is arranged to supply an electrical signal proportional to the vertical component of the total acceleration $a_Z$ acting on the craft which signal is supplied as the divisor for electronic divider 21.

Longitudinal accelerometer 13 is arranged to supply an electrical signal proportional to the longitudinal component of the total acceleration $a_X$ acting on the craft which signal is supplied as an input to a further summing amplifier 22. The effect of craft velocity change component, i.e., craft airspeed acceleration, on the longitudinal accelerometer 10 is determined by $\dot{V}_T$ computer 14 which supplies a corresponding signal applied as another input to summing amplifier 22. The effect of craft flight path angle on the longitudinal accelerometer 10 is in part determined by $\sin \gamma$ computer 15 which is modified by the gravity constant g before being applied as a further input to amplifier 22. The output of summing amplifier 22 is therefore a signal which is proportional to the algebraic sum of these input signals and which constitutes the numerator of equation (13) and represents that longitudinal component of craft acceleration due to craft angle of attack compensated for the effects of craft airspeed changes and flight path angle and gravity.

The numerator output of amplifier 22 and denominator outputs 10 are applied to divider 21 whereby to provide in its output the desired measure of or output signal proportional to the sine of craft angle of attack $\alpha$. The angle of attack output of divider 21 may be suitably isolated and gain controlled by means of isolation amplifier 22'. Thus, from primary measures of craft accelerations parallel to the craft longitudinal and vertical axes and measures of the direction of the relative wind, herein air data derived flight path angle information and the airspeed acceleration of the aircraft, all measures available from apparatus within the aircraft structure, together with information regarding the angular orientation of the g forces measured, an accurate measure of angle of attack is provided.

FIG. 7 illustrates an embodiment of the present invention for generating a signal accurately proportional to acceleration of the aircraft along its flight path and thus may be employed as the $\dot{V}_T$ data source 14 of FIG. 6. The implementation is based on deriving redundant measures of this acceleration term; one based on inertial elements, the other on air data. The two measures are processed by frequency responsive networks in a manner to eliminate undesirable frequency characteristics and yet retain accurate dynamic response. The mathematical development for the $\dot{V}_T$ computer is summarized in the following relationship.

$$\left( \frac{V_T}{\tau_1} + \dot{V}_T \right) \left( \frac{\tau_1 S}{\tau_1 S + 1} \right) = \dot{V}_T \qquad (15)$$

In equation (15) $V_T$ represents the true airspeed output of an air data computer and $\tau_1$ is the time constant of an electronic washout circuit having a transfer function $(\tau_1 S/\tau_1 S+1)$ where $S$ is the time differential operator $d/dt$.

The $\dot{V}_T$ term on the left side of equation (15) is determined from accelerator and gyro data in accordance with the relationship of equation (7). The blocks shown at the left of FIG. 7 comprise the sources of data for the flight path acceleration computer. It should be understood that the sources 10 and 13 are identical to the corresponding blocks of FIG. 4. The alpha computer data source 23 should be understood to be the entire computer represented as FIG. 6 as will be apparent in FIG. 9. The air data computer 24 is completely conventional and transforms measures of static pressure, pitot pressure, and air temperature into electrical quantities proportional to true airspeed, $V_T$. Such an air data sensor may be of the type shown in applicant's U.S. Pat. No. 2,936,134. The multiplier circuit 28 in conjunction with isolation amplifier 29 operates to process $\cos \theta$ and $\cos \phi$ outputs of signal processor 16 and $a_Z$ output of accelerometer 10 to provide a signal equal to $a_Z - g \cos \theta \cos \phi$. The multiplier circuit 30 operates to provide an output which is equal to $\sin \alpha(a_Z - g \cos \theta \cos \phi)$. The multipliers may also use operational amplifiers and pulse width modulation techniques as was done with the divider networks. The latter term is algebraically summed in summing amplifier 31 with the output of fore/aft accelerometer 13 to provide short term, i.e., inertially derived, $\dot{V}_T$ in accordance with equation (7), based on the assumption that the value of cos $\alpha$ is very nearly equal to unity. This constitutes the $\dot{V}_T$ term on the left side of equation (15). The $V_T/\tau_1$ (air data) 13 being passed through washout filter 32 having a time constant $\tau_1$. The time constant $\tau_1$ of washout circuit 32 is chosen to be long enough to filter anomalies in the pitot-static system of the aircraft due to pitch rates, wind gusts, wind shear, etc., but short enough as not to be affected by the long term effects of the erection characteristics of the vertical gyroscope. A value of 10 seconds is a typical value which meets these requirements in transport type aircraft.

FIG. 8 illustrates a preferred embodiment for a computer for generating a signal proportional to sine flight path angle, which term is required for the computation of sin $\alpha$ and thus constitutes the source 15 of sin $\gamma$ in FIG. 6. The implementation is based on deriving redundant measures of the vertical speed of the aircraft; one based on inertial elements, the other on air data. Here again, as in the case of the flight path acceleration term, the two measures are processed by a frequency responsive network in a manner to eliminate undesirable characteristics and yet retain smoothness, accuracy, and excellent dynamic response. The mathematical development is summarized in relationships 14 and 16, 17 which follow:

$$(\ddot{h} + \tau_2 \dot{h}) \left( \frac{1}{\tau_2 S + 1} \right) = \dot{h} \quad (16)$$

From FIG. 2, $$\ddot{h} = a_{A_X} \sin \theta + a_Z \cos \theta \cos \phi - g \quad (17)$$

In equation (16), $\dot{h}$ represents the vertical speed and is an available output of a conventional air data computer, $\tau_2$ is the time constant of an electronic filter circuit having a transfer function $(1/\tau_2 S+1)$ where S is the time differential operator ($d/dt$). The terms that enter into equation (17) for $\ddot{h}$ represent the projection of the total longitudinal plane acceleration vector $a_L$ of FIG. 3 onto the vertical axis, which is compensated for the acceleration of gravity g.

FIG. 8 illustrates a preferred analog computer for solving equations (16) and (17) using techniques similar to those described for the angle of attack computer of FIG. 6 and the flight path acceleration computer of FIG. 7. It will be noted that the signal sources 24, 10, 13 and 11 are the same as those for the computation of $a$ and $\dot{V}_T$ with the addition of the voltage source 12 and the vertical rate term from the air data computer 24 and the inclusion of the time constant $\tau_2$ in the acceleration terms. Multiplier 33, isolation amplifier 34 and multiplier 35 provide the $a_Z \cos \theta \cos \phi$ term while multiplier 36 provides the $a_X \sin \theta$ term and a voltage source 12 provides the constant g term, all of equation (17). These terms are algebraically combined in amplifier 37 to provide the $\ddot{h}$ term of equation (10). This term together with the barometric vertical rate term $\dot{h}$ from the air data computer, i.e., the output of amplifier 37, are applied to a washout filter 38 having the indicated transfer function, wherein $\tau_2$ is on the order of 4 seconds which is long enough to filter out the anomolies of the air data static source, but clearly short enough to not be affected by the erection characteristics of the vertical gyro. Thus, the output of the filter circuit 38 is a noise free accurate signal proportional to vertical speed of the aircraft and may be used for other aircraft systems requiring this term as well as for the display of this important parameter in the cockpit. This signal has excellent dynamic performance without suffering from the noise and static source anomolies inherent in pure air data derivations. Many baro-inertial implementations were adversely affected by bank turns which causes spurious and inaccurate results. The computation of $\dot{h}$ described herein does not suffer from this effect because of the compensations provided by measures of bank angle and the inclusion of X-axis acceleration as a supplement to the Z-axis acceleration normally used alone for this purpose in previous embodiments of baro-inertial vertical speed indicators.

The solution of equation (14) is accomplished by the dividing network 39 and isolation amplifier 40.

In the foregoing, the computation of angle of attack $\alpha$, flight path acceleration $\dot{V}_T$, and flight path angle were shown separately for the purpose of clarity. However, it will be understood that in practice these computations are integrated into a single computer for providing a computation of the value of the aircraft angle of attack with the auxiliary outputs of $\dot{V}_T$, $\gamma$, and $\dot{h}$ being provided for use in other systems requiring these measures.

Figure 9A:
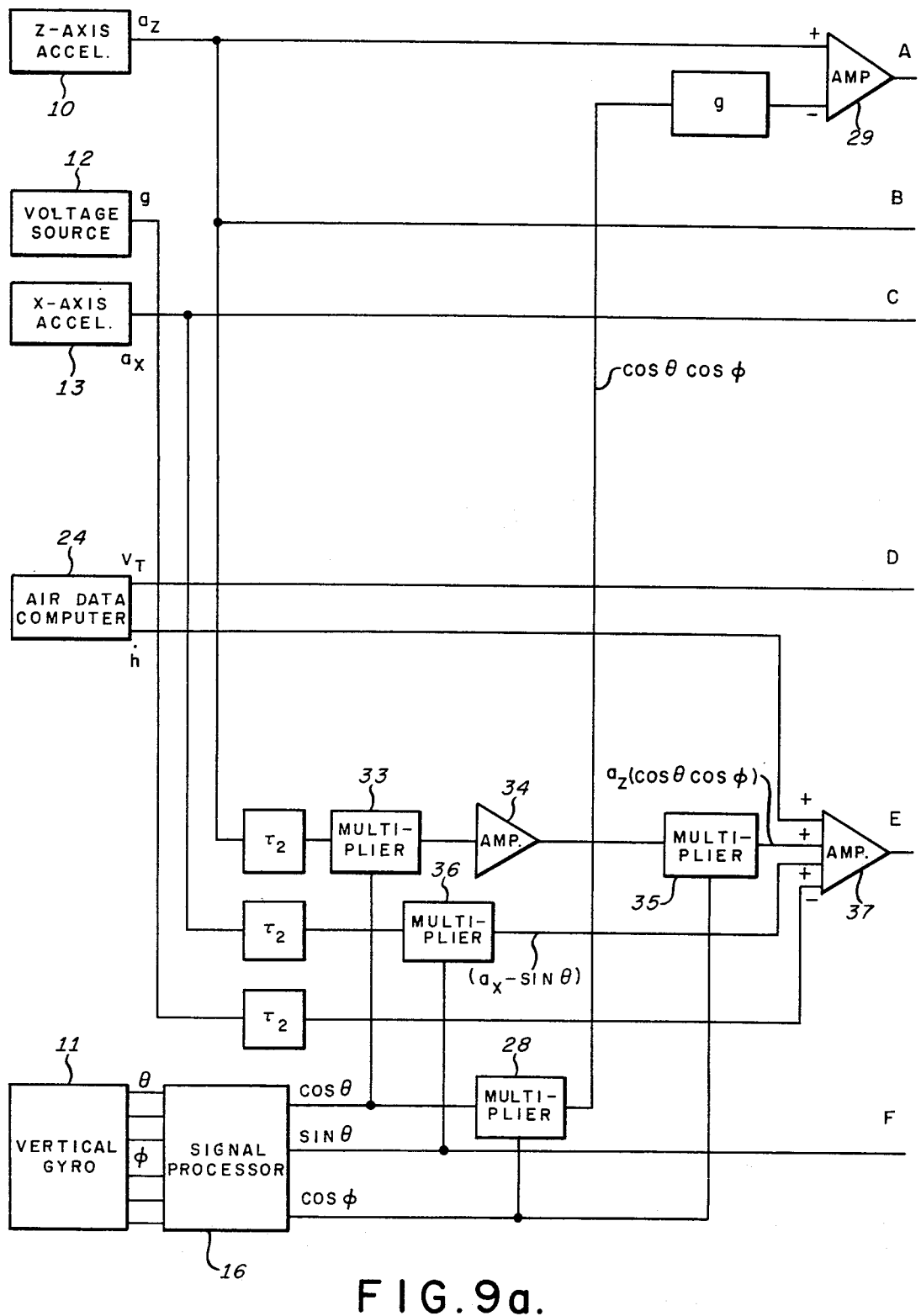
FIGS. 9a and 9b are an integrated block diagram including the subcomputation arrangements of FIGS. 6, 7 and 8.
Figure 9B:
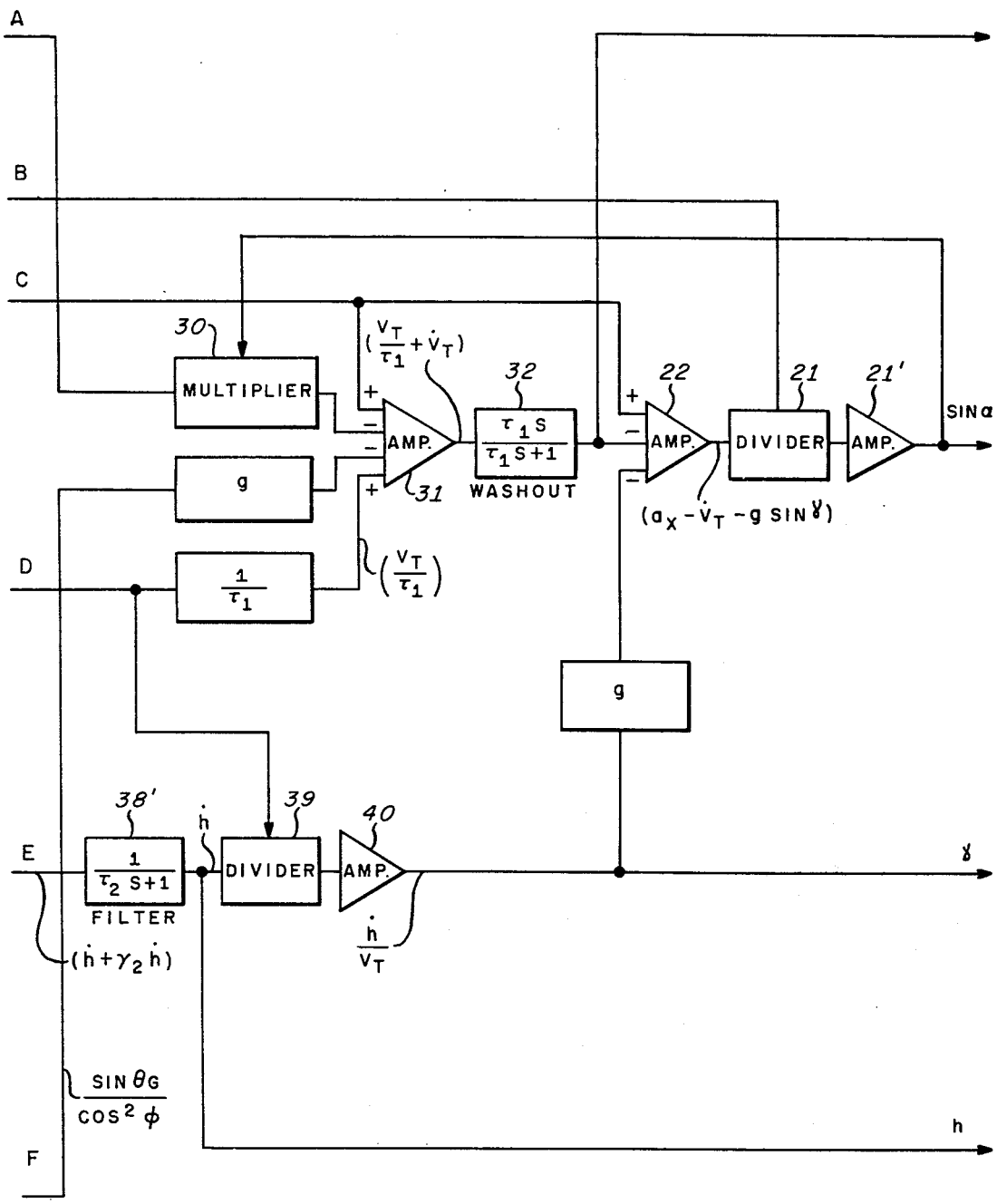

FIG. 9 illustrates the composite block diagram of the overall computer of the present invention wherein corresponding reference characters are used to designate the corresponding blocks in FIGS. 6, 7 and 8. It is believed that with the notations indicated on the block diagrams, the computation functions are clearly set forth and hence a detail description of these functions is not required.

Although the computation techniques illustrated in the preferred embodiment of the present invention are analog, it will be understood that relationships solved can easily be adopted to solution by digital computer techniques.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for providing a measure of the acceleration of an aircraft along its flight path comprising
   a. inertial means including accelerometers and gyroscopic means for providing a first signal in accordance with the acceleration of said craft along its flight path, said first signal including relatively long term error components produced by the erection characteristics of said gyroscopic means,
   b. air data sensor means including a Pitot static source of air pressure for providing a second signal in accordance with the velocity of the aircraft along its flight path, said second signal including relatively short term error components produced by short term anomalies in said Pitot-static source,
   c. a washout filter means having a time constant such as to block said long term components of said first signal and to suppress said short term components of said second signal, and d. means supplying both of said signals to said washout filter means whereby to pass changing values of said air data derived velocity signals to block said long term error components of said inertial acceleration signal and to suppress said short term components of said air data sensor signal.

2. The apparatus as set forth in claim 1 wherein said accelerometer means includes a pair of accelerometers orthogonally mounted in said aircraft and responsive to components of total craft accelerations in the longitudinal plane thereof and for providing signals in accordance therewith.

3. The apparatus as set forth in claim 2 further including means responsive to the angle of attack of said aircraft for modifying said acceleration component signals in accordance therewith.

* * * * *